(12) United States Patent
Kuroki et al.

(10) Patent No.: US 7,411,588 B2
(45) Date of Patent: Aug. 12, 2008

(54) DISPLAY APPARATUS AND INFORMATION PROCESSING METHOD

(75) Inventors: Tsuyoshi Kuroki, Tokyo (JP); Akihiro Katayama, Kanagawa (JP); Eita Ono, Kanagawa (JP); Masahiro Suzuki, Tokyo (JP); Mahoro Anabuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 11/126,355

(22) Filed: May 11, 2005

(65) Prior Publication Data

US 2005/0212801 A1      Sep. 29, 2005

Related U.S. Application Data

(62) Division of application No. 10/266,683, filed on Oct. 9, 2002, now Pat. No. 6,970,166.

(30) Foreign Application Priority Data

Oct. 31, 2001    (JP)    .............................. 2001/334707

(51) Int. Cl.
*G06T 15/00*    (2006.01)
(52) U.S. Cl. ........................ 345/428; 345/629; 345/634; 396/374; 348/333
(58) Field of Classification Search ......... 345/629–630, 345/428, 634, 632–633; 396/374, 386; 348/333
See application file for complete search history.

(56) References Cited

U.S. PATENT DOCUMENTS

| 5,786,852 | A | 7/1998 | Suzuki et al. | ................ 348/312 |
| 6,683,725 | B2 | 1/2004 | Wohlstadter | ................. 359/626 |
| 6,765,569 | B2 | 7/2004 | Neumann et al. | ........... 345/419 |
| 6,795,650 | B2 | 9/2004 | Cahall | ......................... 396/374 |
| 6,970,166 | B2 * | 11/2005 | Kuroki et al. | ................ 345/428 |
| 7,193,633 | B1 * | 3/2007 | Reinhardt et al. | ........... 345/629 |

FOREIGN PATENT DOCUMENTS

JP    2833206    10/1998

* cited by examiner

*Primary Examiner*—Phu K Nguyen
(74) *Attorney, Agent, or Firm*—Fitzpatrick, Cella, Harper & Scinto

(57) ABSTRACT

A display apparatus for displaying a virtual image superposed upon a real world image, which can automatically set the focus of a lens to the virtual image, a virtual world image object having a high importance degree or a real world image object having a high importance degree. The display apparatus has a lens for capturing light from a real world, a lens state control unit for controlling a state of the lens including a focus, a storage unit for storing computer image data, a computer image generation unit for generating a computer image by using the computer image data stored in the storage unit in accordance with lens state information of the lens state and the like; and a synthesis display unit for synthesizing an image captured via the lens and the generated computer image and displaying a synthetic image.

11 Claims, 7 Drawing Sheets

FIG.7

| FOCAL DISTANCE | FOCAL VALUE |
|---|---|
| 0.6m | 1 |
| 1.0m | 2 |
| 2.0m | 3 |
| ⋮ | ⋮ |
| ∞ | 256 |

DISPLAY APPARATUS AND INFORMATION PROCESSING METHOD

The present application is a divisional of application Ser. No. 10/266,683, filed Oct. 9, 2002, the entire content of which is incorporated herein by reference.

BACKGROUND OF THE INVENTION

1. Field of the Invention

The present invention relates to synthesizing a real image and a created image.

2. Description of the Related Art

A telescope placed at an observation platform or the like captures a scene viewed from the platform, optically enlarges and presents it to a user. A telescope optically enlarges a scene and presents it to a user so that it can present only an object existing in a real world. For example, a telescope can neither present information such as an address and a name of a building existing in the real world nor provide the real world with virtual characters.

The following related art solving such problems is known.

Japanese Patent No. 2833206 "Display at Observation Platform" discloses techniques of synthesizing a real scene taken with a telescope and virtual characters and images. The display disclosed in this patent synthesizes real world light in front of the display and image display light from a plane on which virtual characters and images are displayed by using a combiner constituted of a half mirror and the like, and presents the synthetic image to a user. The techniques of displaying a real world image and a computer generated image synthesized by a half mirror and the like are called an optical see-through display method.

There is another conventional system in which a HMD (head mount display) with a built-in camera is mounted on a head and real scenes captured while the HMD is moved as the head moves and computer images are synthesized. The techniques of displaying a scene image photographed with a camera and an image generated by a computer or the like synthesized together are called a video see-through display method.

With both the optical see-through and video see-through display methods, a zoom lens is sometimes used for enlarging a real world scene. Most of such zoom lenses are equipped with a mechanism for adjusting a focus. The focus is adjusted manually by a user viewing a scene through a display apparatus or automatically with an auto focusing mechanism.

It is, however, difficult to adjust the focus of a zoom lens to a virtual character displayed in a real world scene. With the auto focusing mechanism, the focus is adjusted always to a real world scene beyond virtual characters, and it is impossible to adjust the focus to the virtual characters. This point has been desired to be improved.

SUMMARY OF THE INVENTION

The invention has been made under the above-described circumstances. It is an object of the invention to automatically adjust the focus of a lens to a virtual object synthetically displayed in a real world scene and improve ambiance.

It is another object of the invention to automatically adjust the focus of a lens to an object with a high importance among a virtual object and a real world object and make it easy for a user to distinguish an object with a high importance.

In order to achieve the above objects of the invention, there is provided a display apparatus comprising: a lens for capturing light from a real world; a lens state control unit for controlling a state of the lens, the state including a focus; a storage unit for storing computer image data; a computer image generation unit for generating a computer image by using the computer image data stored in the storage unit in accordance with lens state information and the like; and a synthesis display unit for synthesizing an image captured via the lens and the generated computer image and displaying a synthetic image, wherein the focus of said lens is changed according to a position or a size where the computer image is displayed.

The focus of the lens may be changed in accordance with an importance degree of a computer image object.

The storage unit may store real world model data and importance degree information of each model, and the focus of the lens is changed in accordance with an importance degree of a computer image object and a real world image.

BRIEF DESCRIPTION OF THE DRAWINGS

FIG. 7 is a diagram showing a correspondence between a focal distance and a focal value.

DETAILED DESCRIPTION OF THE PREFERRED EMBODIMENTS

Preferred embodiments of the invention will be described with reference to the accompanying drawings.

First Embodiment

Figure 1:
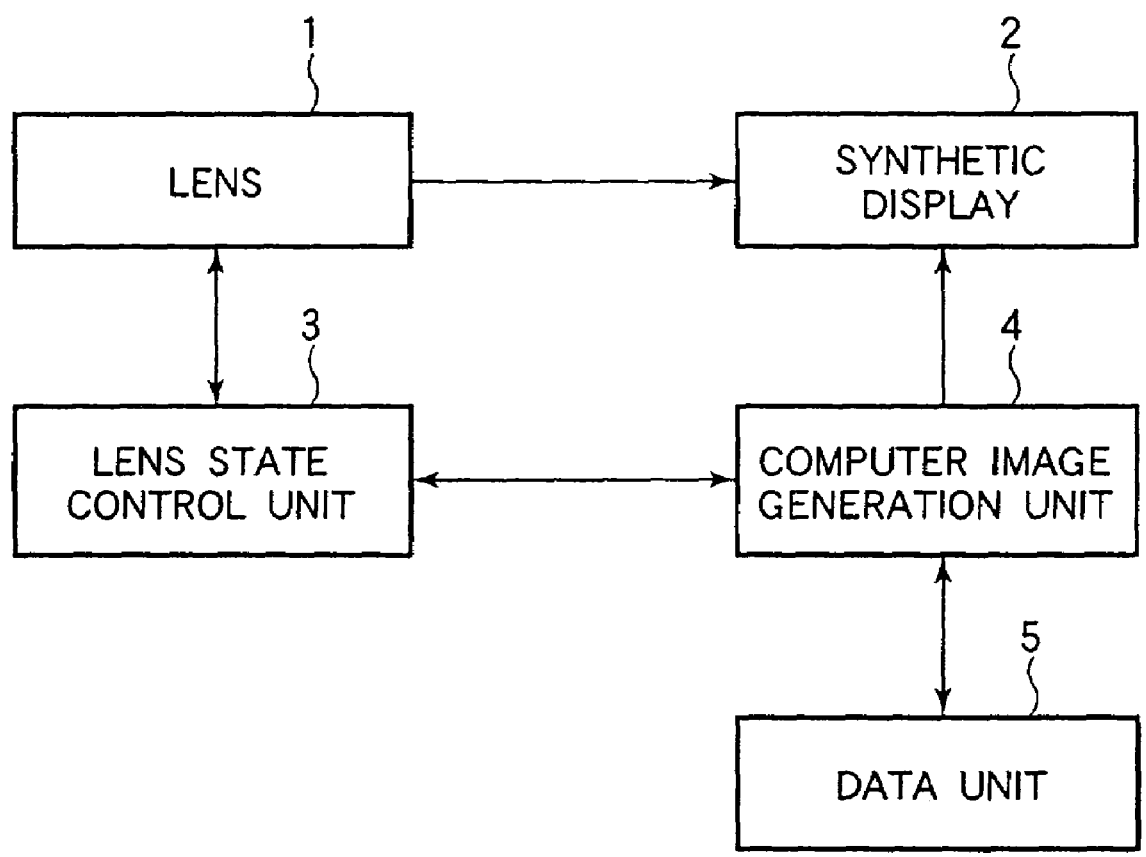
FIG. 1 is a block diagram showing the outline structure of a display apparatus according to a first embodiment of the invention.

In this embodiment, an image synthesizing apparatus is used as a telescope at an observation platform or the like or an information display terminal at a museum or the like. FIG. 1 is a block diagram showing the outline structure of the image synthesizing apparatus of the first embodiment.

The first embodiment will be described by using an image synthesizing apparatus of the optical see-through display type. A lens 1 is, for example, a zoom lens. The lens 1 receives real world light, enlarges the scene and supplies it to a synthetic display unit 2. The synthetic display unit 2 synthesizes a scene image supplied from the lens 1 and a computer image supplied from a computer image generation unit 4 by using a half mirror and the like, and supplies the synthetic image to a user of the apparatus.

A lens state control unit 3 is constituted of, for example, a mechanical encoder and a stepping motor. In response to or without a request from the computer image generation unit 4, the lens state control unit 3 sends lens state information including a zoom value and a focal value of the lens 1 to the computer image generation unit 4.

The zoom value and focal value are output from an encoder or the like of the lens state control unit 3. For example, if the lens state control unit 3 has an 8-bit encoder, the output value is in the range from 1 to 256. Generally, the focal length of the lens 1 can be calculated from the zoom value, and the focal distance of the lens 1 can be calculated from the focal value. The focal distance can be calculated from the focal value by using a conversion table such as shown in FIG. 7 prepared beforehand and indicating a correspondence between the focal distance and focal value, and the focal distance not present in the table is calculated through interpolation.

Calculations of the focal length from the zoom value and the focal distance from the focal value are mainly performed by the computer image generation unit 4. Instead, the lens state control unit 3 may be provided with a microcomputer which calculates the focal length and focal distance of the lens 1 from the lens state information including the focal value and zoom value, the calculated values being output as the lens state information.

The lens state control unit 3 controls the state of the lens 1 by using an operation unit (not shown) and control signals. For example, the lens state control unit 3 receives a focal value from the computer image generation unit 4 and sets the lens to the received focal value. For example, the lens state control unit 3 is constituted of a mechanical encoder and a stepping motor.

The computer image generation unit 4 acquires the lens state information from the lens state control unit 3 and estimates the angle of view and the like of the lens 1. The angle of view of the lens 1 can be calculated from the focal length of the lens 1. If the angle of view is known, the view field can be known. The computer image generation unit 4 acquires the data contained in the view field of the lens 1 from a data unit 5, and generates a computer image to be superposed upon the view field of the lens 1. The generated computer image is supplied to the synthetic display unit 2.

The computer image generation unit 4 judges whether it is necessary to adjust the focus to a CG (computer graphics) image to be drawn by using the data contained in the view field of the lens 1. If it is necessary to adjust the focus to the CG image, an adaptation focus value corresponding to the in-focus of the CG image is calculated, and the calculated adaptation focus value is sent to the lens state control unit 3.

The data unit 5 is constituted of, for example, a hard disk storing data to be passed to the computer image generation unit 4. The data stored in the data unit 5 may be three-dimension CG data. In response to a request from the computer image generation unit 4, the data unit 5 sends proper data to the computer image generation unit 4. For example, when the computer image generation unit 4 requests three-dimension CG data to be superposed in the view field of the lens 1, the data unit 5 sends the three-dimension CG data contained in the view field of the lens 1 among three-dimension CG data in the data unit 5. The data in the data unit 5 may be virtual building data, character data and the like.

Figure 2:
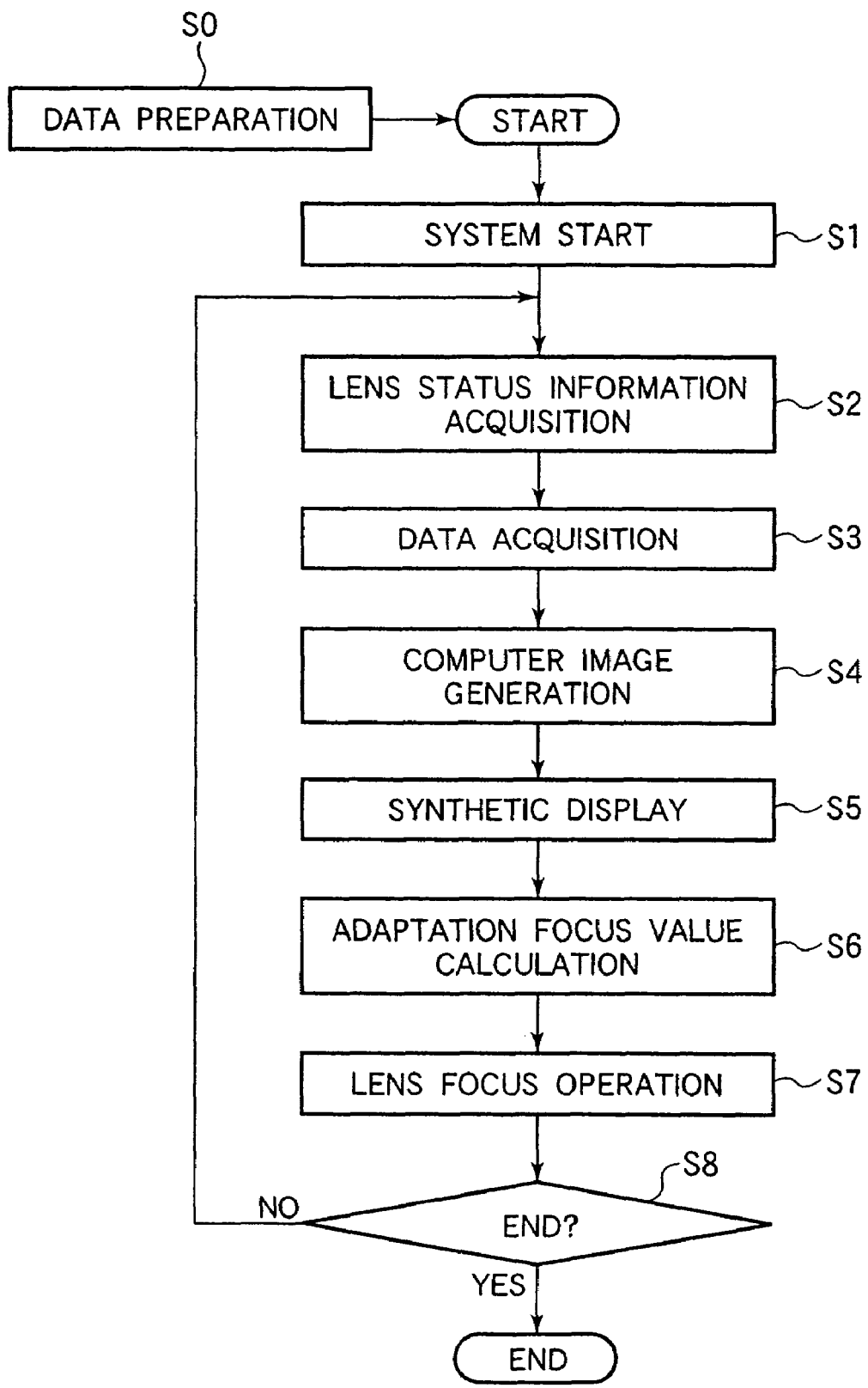
FIG. 2 is a flow chart illustrating the processes to be executed by the display apparatus of the first embodiment.

The control by the apparatus of this embodiment constructed as above will be described. FIG. 2 is a flow chart illustrating the processes to be executed by the image synthesizing apparatus of the embodiment.

At Step S0 data to be stored in the data unit 5 is prepared. The data may be three-dimension CG data or the like. It is necessary that the data in the data unit 5 has a predetermined position correspondence with a real world scene. In the three-dimension CG data, it is necessary to designate the position of each of the three-dimension CG data in a real world scene. If three-dimension CG data shows a moving CG character image, it is necessary to designate the positions along which the CG character image moves in the real world scene.

After the data is prepared, the system starts at Step S1. At Step S2 the lens state control unit 3 detects the lens state information including the zoom value and focal value of the lens 1, and sends the detected lens state information to the computer image generation unit 4. At Step S3 the computer image generation unit 4 estimates the view field of the lens 1 from the lens state information sent from the lens state control unit 3, and acquires the data contained in the range of the view field of the lens 1 from the data unit 5.

At Step S4 the computer image generation unit 4 generates a computer image by using the data acquired from the data unit 5 and the lens state information acquired from the lens state control unit 3. In generating a computer image, the view field of the lens 1 is judged from the lens state information, and the computer image contained in the range of the view field is generated and sent to the synthetic display unit 2.

When a computer image is to be generated, each CG object in the computer image may be drawn unsharply by referring to the focal value in the lens state information. This method will be described below. First, a virtual distance to each CG object from the optical center of the lens 1 is calculated. There are various methods of calculating a virtual distance to a CG object to be focused from the optical center of the lens 1. Among these methods, the simplest method will be described with reference to FIG. 6.

Figure 6:
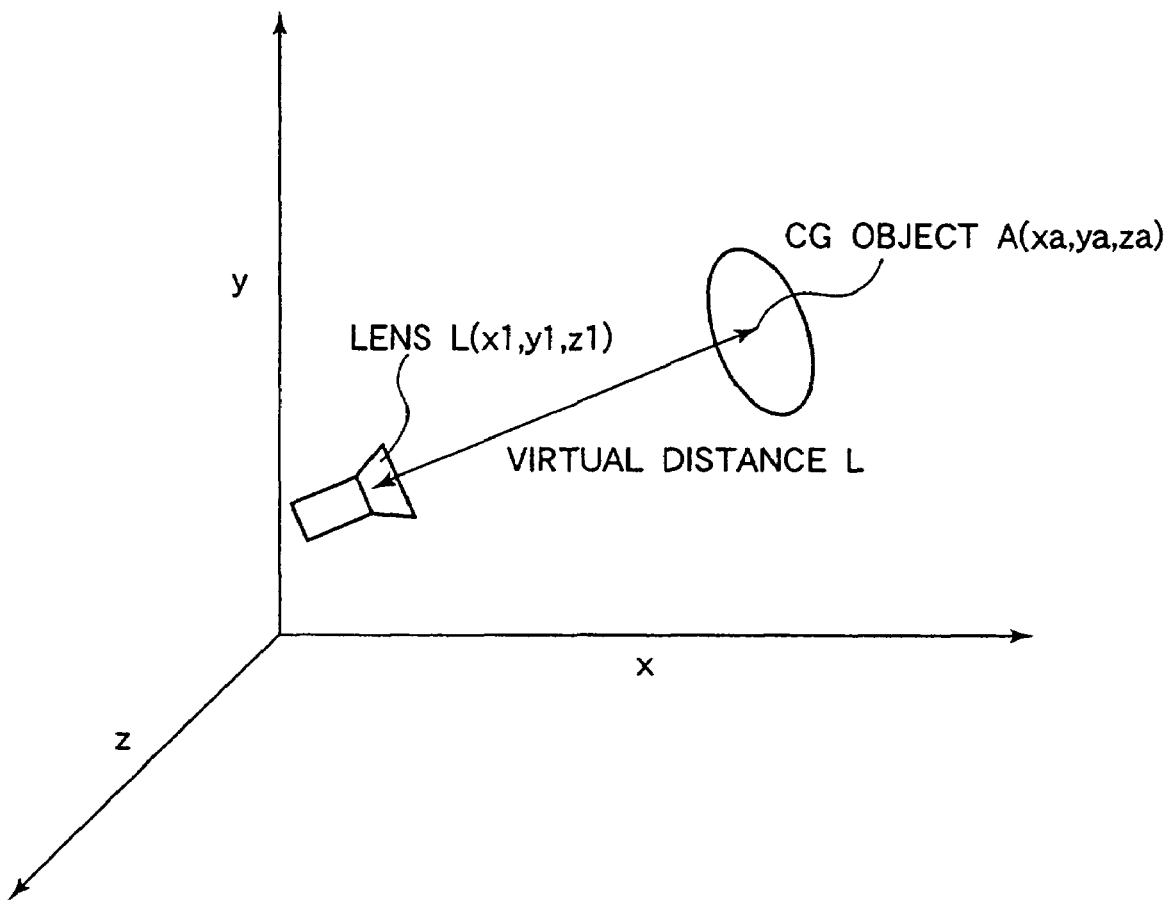
FIG. 6 is a diagram explaining a method of calculating a virtual distance to a CG object to be focused from the optical center of a lens.

Referring to FIG. 6, it is assumed that the data unit 5 stores the position L(x1, y1, z1) of the optical center of the lens 1 and the position A(xa, ya, za) of a CG object A. A virtual distance L to the CG object A from the optical center of the lens 1 is given by the following equation:

$$L=\sqrt{(xa-x1)^2+(ya+y1)^2+(za-z1)^2}$$

A virtual distance to a CG object from the optical center of the lens 1 can be calculated by using the above equation. Any method may be used if it can calculate the virtual distance to a CG object from the optical center of the lens 1. For example, a distance to the surface of a CG object from the optical center of the lens 1 may be calculated.

After the virtual distance to the CG object from the optical center of the lens 1 is calculated, the virtual distance is compared with the focal distance of the lens 1 calculated from the lens state information acquired at Step S2. If the virtual distance to the CG object from the optical center of the lens 1 is coincident with the focal distance of the lens 1, the CG object is drawn without unsharpening it. The larger the difference between the virtual distance to the CG object from the optical center of the lens 1 and the focal distance of the lens 1 is, the more unsharply the CG object is drawn. It is therefore possible to draw each CG object in the computer image in accordance with the focal value of the lens 1 and to increase ambiance of the computer image.

At Step S5 the synthetic display unit 2 synthesizes a scene image taken with the lens 1 and the computer image sent from the computer image generation unit 4 by using a half mirror and the like, and presents the synthetic image to the user.

At Step S6 the computer image generation unit 4 judges from the data contained in the view field of the lens 1 whether it is necessary to focus the lens to a CG object to be drawn. If necessary, the adaptation focus value corresponding to the in-focus of the CG object is calculated and sent to the lens state control unit 3.

There are various judgment criteria at Step S6 for judging whether it is necessary to focus the lens to a CG object. In one judgment criterion described herein, if a CG object occupies most of the central area of the view field, the lens is focused to the CG object. This judgment criterion will be described with reference to FIG. 5.

Figure 5:
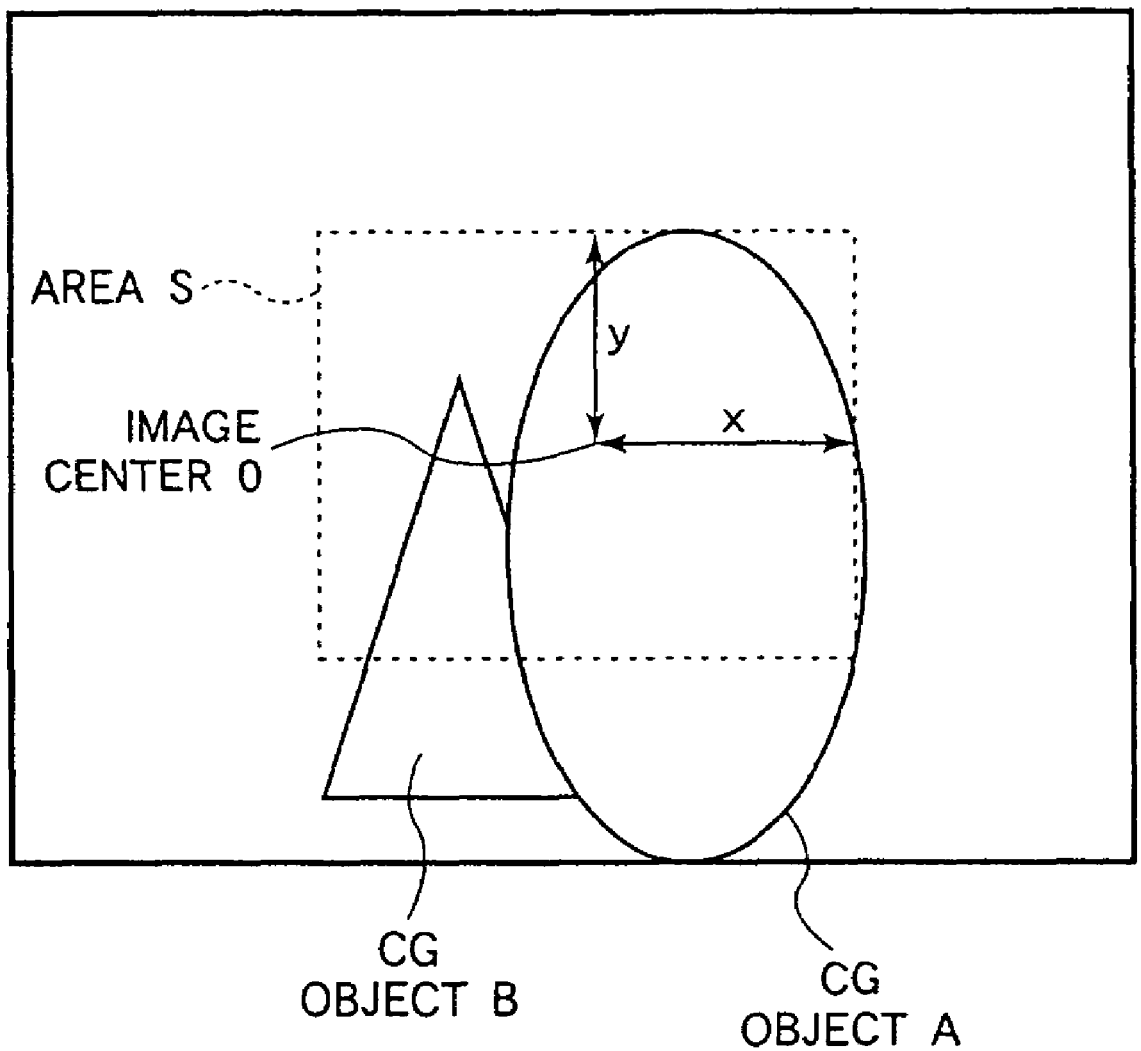
FIG. 5 is a diagram explaining a method of identifying a CG object to be focused.

Referring to FIG. 5, a rectangular computer image I is an image generated by the computer image generation unit 4 at Step S4. In this computer image, a CG object A and a CG object B are drawn. An area S is defined by a rectangle having a height of 2y and a width of 2x with the center O of the computer image I, where x and y are determined as desired. An area S2 in the area S where a CG object does not exist is given by:

$$S2 = SS - SA - SB$$

where SS is an area of the area S, SA is an area in the area S occupied by the object A, and SB is an area in the area S occupied by the object B. By comparing these areas S2, SA and SB, the lens is focused to the area having the largest area. Namely, it is judged that if the area S2 is largest, it is not necessary to focus the lens to the CG objects, that if the area SA is largest, the lens is focused to the CG object A, and that if the area SB is largest, the lens is focused to the CG object B. With this judgment, it is possible to focus the lens to the CG object in the central area of the CG image having relatively high attention of the user of this display apparatus.

With this judgment criterion, the lens is focused to the CG object which occupies a large area in the central area of the view field. Other judgment criteria may also be used. For example, the lens may be focused to a CG object on the center of the view field, i.e., on the image center O. With these judgment criteria, it becomes possible to judge easily whether the lens is to be focused to a CG object.

If it is judged at Step S6 that the lens is to be focused to a CG object, the computer image generation unit 4 calculates a virtual distance to the CG object to be focused from the optical center of the lens 1, and calculates the adaptation focus value matching the virtual distance by using the table shown in FIG. 7 or the like.

At Step S7 in accordance with the received adaptation focus value, the lens state control unit 3 controls the focus of the lens 1.

Thereafter, it is checked at Step S8 whether the system is to be terminated. If not, the flow returns to Step S2 to repeat the above-described processes.

As described above, according to the image synthesizing apparatus of the optical see-through type of the first embodiment, for example, a virtual character image superposed upon a building scene can be viewed, and if the focal value of the lens 1 is matched with the virtual character image, it is possible to synthesize a photographed real world image and the virtual character image without any unnatural feeling. This can be achieved by storing in advance in the data unit 5 three-dimension CG data of virtual character images. Namely, the proper position of each three-dimension CG character image in a real world building group image is determined in advance and the CG character image is superposed upon the building group image taken with the lens 1.

Second Embodiment

Figure 3:
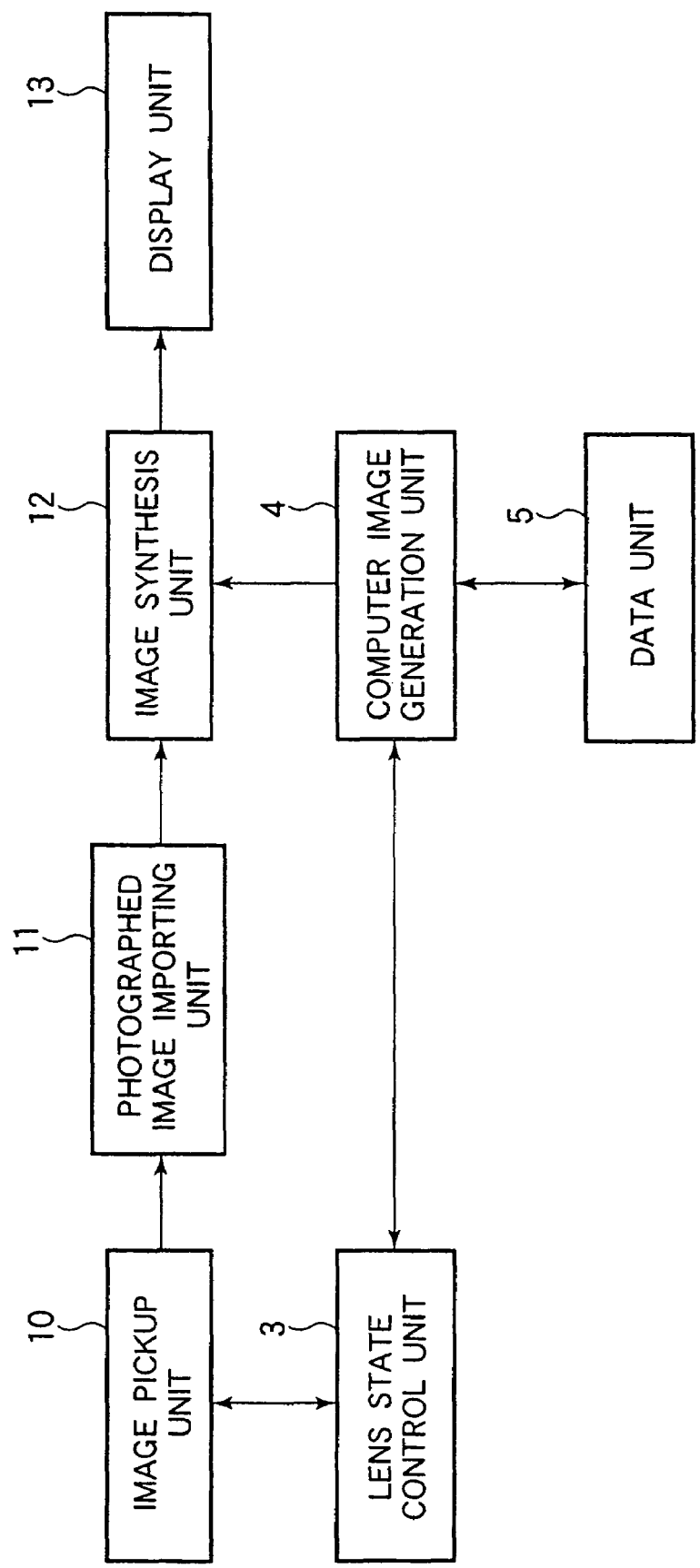
FIG. 3 is a block diagram showing the outline structure of a display apparatus according to a second embodiment of the invention.

The second embodiment will be described by using an image synthesizing apparatus of the video see-through display type. FIG. 3 is a block diagram showing the outline structure of the image synthesizing apparatus of the second embodiment. The outline of the second embodiment is given in the following.

An image pickup unit 10 is, for example, a camera. The image pickup unit 10 is installed indoors or outdoors to pickup a real world scene such as an outdoor landscape image and an indoor exhibit and outputs as video signals a photographed image to a photographed image importing unit 11. The photographed image importing unit 11 converts the video signals supplied from the image pickup unit 10 into signals suitable for an image synthesis unit 12 to supply them to this unit 12. The image synthesis unit 12 synthesizes the photographed image supplied from the photographed image importing unit 11 and a computer image supplied from a computer image generation unit 4 and sends the synthesized image to the display unit 13.

A lens state control unit 3 is constituted of, for example, a mechanical encoder and a stepping motor. In response to or without a request from the computer image generation unit 4, the lens state control unit 3 sends lens state information including a zoom value and a focal value to be used by the image pickup unit 10 to the computer image generation unit 4. The lens state control unit 3 controls the state of the lens 1 by using an operation unit (not shown) and control signals. For example, the lens state control unit 3 receives a focal value from the computer image generation unit 4 and sets the lens to the received focal value.

The computer image generation unit 4 acquires the lens state information from the lens state control unit 3 and estimates the angle of view and the like of the image pickup unit 10. The view field of the image pickup unit 10 can be determined from the direction and the angle of view of the image pickup unit 10. Therefore, the computer image generation unit 4 acquires the data contained in the view field of the image pickup unit 10 from a data unit 5, and generates a computer image to be superposed upon the view field of the image pickup unit 10. The generated computer image is supplied to the synthetic display unit 12.

The computer image generation unit 4 judges whether it is necessary to adjust the focus to a CG (computer graphics) image to be drawn by using the data contained in the view field of the image pickup unit 10. If it is necessary to adjust the focus to the CG image, an adaptation focus value corresponding to the in-focus of the CG image is calculated, and the calculated adaptation focus value is sent to the lens state control unit 3.

The data unit 5 is constituted of, for example, a hard disk storing data to be passed to the computer image generation unit 4. The data stored in the data unit 5 may be three-dimension CG data. In response to a request from the computer image generation unit 4, the data unit 5 sends proper data to the computer image generation unit 4. For example, when the computer image generation unit 4 requests three-dimension CG data to be superposed upon the view field of the image pickup unit 1, the data unit 5 sends the three-dimension CG data contained in the view field of the image pickup unit 10 among three-dimension CG data in the data unit 5.

A display unit 13 displays synthetic video signals supplied from the image synthesis unit 12. Although the display unit 13 is preferably moved in association with the image pickup unit 10, it is not necessarily required. For example, the image pickup unit 10 may be made movable, whereas the display unit 13 may be fixed. A plurality of display units 13 may be provided. In this case, many people can view the synthetic image.

Figure 4:
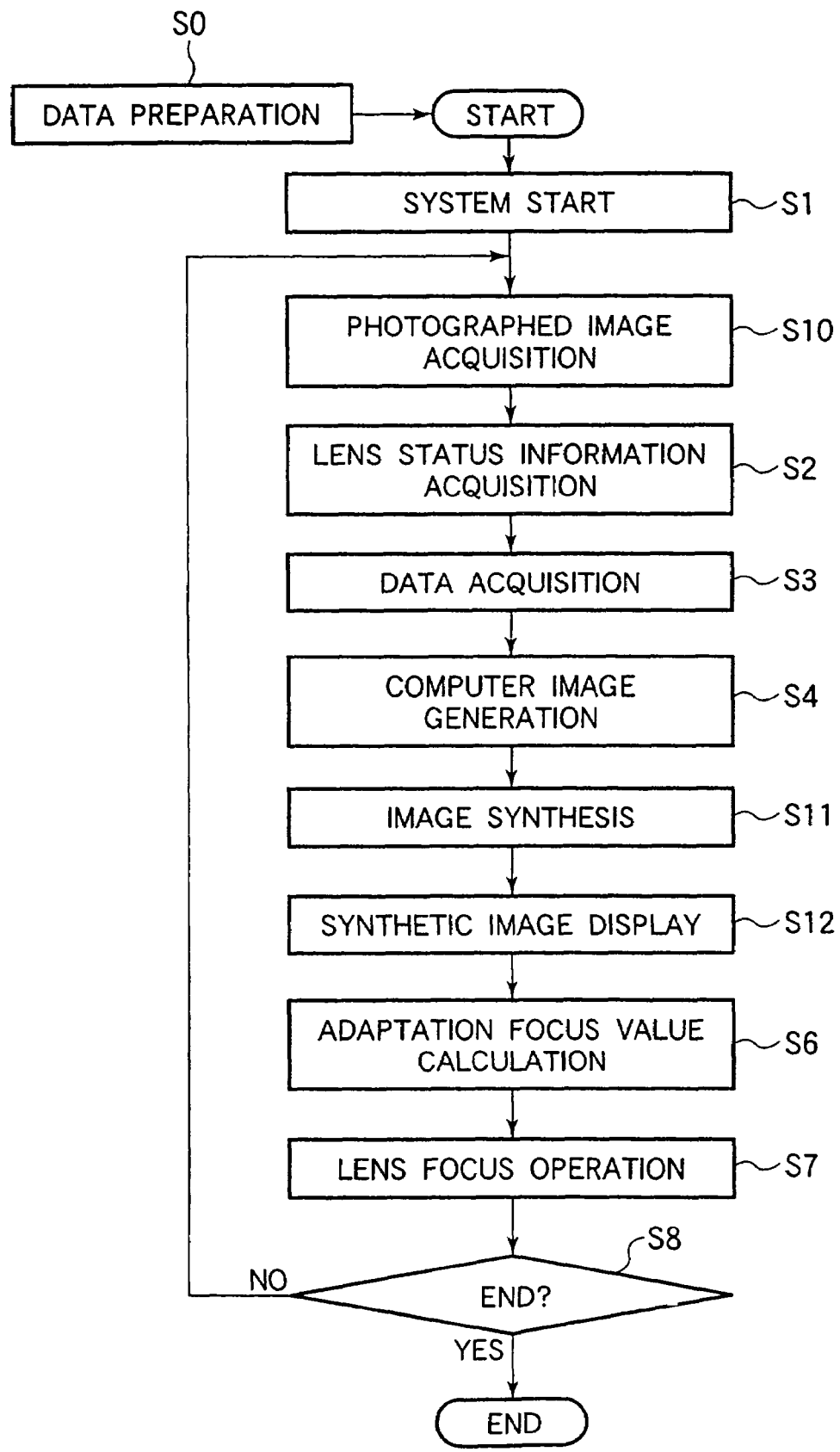
FIG. 4 is a flow chart illustrating the processes to be executed by the display apparatus of the second embodiment.

The control by the apparatus of this embodiment constructed as above will be described. FIG. 4 is a flow chart illustrating the processes to be executed by the image synthesizing apparatus of the embodiment.

At Step S0 data to be stored in the data unit 5 is prepared. The data may be three-dimension CG data or the like. It is necessary that the data in the data unit 5 has a predetermined position correspondence with a real world scene. In the three-dimension CG data, it is necessary to designate the position of each of the three-dimension CG data in a real world scene. If three-dimension CG data shows a moving CG character image, it is necessary to designate the positions along which the CG character image moves in the real world scene.

After the data is prepared, the system starts at Step S1. At Step S10 the image pickup unit 10 captures an image which is converted into an image having a proper format by the photographed image importing unit 11 and sent to the image synthesis unit 12. At Step S2 the lens state control unit 3 detects the lens state information including the zoom value and focal value of the lens used by the image pickup unit 10, and sends the detected lens state information to the computer image generation unit 4. At Step S3 the computer image generation unit 4 estimates the view field of the image pickup unit 10 from the lens state information sent from the lens state control unit 3, and acquires the data contained in the range of the view field of the image pickup unit 10 from the data unit 5.

At Step S4 the computer image generation unit 4 generates a computer image by using the data acquired from the data unit 5 and the lens state information acquired from the lens state control unit 3. The generated image is sent to the image synthesis unit 12.

At Step S11, the image synthesis unit 12 synthesizes the photographed image supplied from the photographed image importing unit 11 and the computer image supplied from the computer image generation unit 4. The synthesized image is sent to the display unit 13. At Step S12 the display unit 13 displays the image information sent from the image synthesis unit 12.

At Step S6 the computer image generation unit 4 judges from the data contained in the view field of the image pickup unit 10 whether it is necessary to focus the lens to a CG object to be drawn. If necessary, the adaptation focus value corresponding to the in-focus of the CG object is calculated and sent to the lens state control unit 3.

At Step S7 the focus of the lens in the image pickup unit 10 is controlled to have the adaptation focus value sent from the lens state control unit 3.

Thereafter, it is checked at Step S8 whether the system is to be terminated. If not, the flow returns to Step 10 to repeat the above-described processes.

As described above, according to the image synthesizing apparatus of the video see-through type of the second embodiment, for example, a virtual character image superposed upon a building scene can be viewed, and if the focal value of the lens of the image pickup unit 10 is matched with the virtual character image, it is possible to synthesize a real world photographed image and the virtual character image without any unnatural feeling.

Other Embodiments

In the above embodiments, at Step S6 it is judged from the position and display area of a computer CG object to be displayed whether the focus of the lens is set to the computer CG object generated by the computer image generation unit 4. Other embodiments utilizing other judgment criteria will be described.

In one embodiment, data to be stored in the data unit 5 is assigned beforehand a parameter representative of an importance degree of the data. When it is judged whether it is necessary to set the focus of the lens to a computer CG object, the parameter of the importance degree is referred to. For example, this embodiment can be realized by judging that the focus is set to the computer CG object having the highest importance degree among computer CG objects displayed in the display screen. Other judgment criteria may also be used if they can judge the object to be focused in accordance with the importance degree. With this method, it becomes possible to automatically set the focus to a computer CG object having a high importance degree. A user of the image synthesizing apparatus of the embodiment can easily distinguish a computer CG object having a high importance degree.

A real world model may be stored in the data unit 5 and assigned with a parameter representative of the importance degree of the real world model. In this case, when the object to be focused is determined at Step S6, it becomes possible to use as an object to be focused not only a computer CG object but also a real world object such as a building. This can be realized, for example, by storing real world three-dimension CG data and virtual three-dimension CG data in the data unit 5. With this method, a user of the image synthesizing apparatus of the embodiment can easily distinguish between a computer CG object and a real world object having a high importance degree.

In another embodiment, actual image data of a real world is stored in the data unit 5. In this embodiment, actual photographed image data of a real world is stored beforehand in the data unit 5. When the computer image generation unit 4 generates at Step S4 a computer image by using the lens state information acquired from the lens state control unit 3, the computer image generation unit 4 uses the whole or part of an actual photographed image to create the computer image. The actual photographed image can be presented to a user of the image synthesizing apparatus of the embodiment. For example, if the image synthesizing apparatus of the embodiment is used at an observation platform or the like, an actual image photographed in a clouded sky can be presented to a user.

In another embodiment, if actual image data of a real world is stored in the data unit 5, depth data is added to the actual images. In this case, at Step S6 an object to be focused is determined and the distance to the object is calculated. In accordance with the calculated distance, the lens focus is controlled. In accordance with the controlled focal value, each area of the actual image can be made unsharp when a computer image is created. This can be realized by dividing an actual photographed image into several areas each assigned depth data. When a computer image is created, the depth data of each area and the lens focal distance are compared. In this case, the larger the difference therebetween is, the more the image in the area can be drawn unsharply. In assigning the depth data to an actual photographed image, any method may be incorporated if it can assign depth data to an actual photographed image.

According to these embodiments, it is possible for the image synthesizing apparatus to automatically set the lens focus to any one of a CG object and a real world object having a higher importance degree. It is also possible to create a computer image from an actual photographed image and change an image in accordance with the lens focus.

The image synthesizing apparatus of the embodiment can be used not only as a telescope at an observation platform or the like but also as an information terminal which is installed, for example, in a museum or the like to allow a user to view a virtual image superposed upon a real world exhibit.

The scope of the invention contains also the case wherein software program codes realizing the function of each embodiment described above are supplied to a computer (CPU or MPU) of an apparatus or system connected to various devices realizing the embodiment function, and the computer operates the devices in accordance with the stored programs.

In this case, the software program codes themselves realize the embodiment function. Therefore, the program codes themselves and means for supplying the program codes to a computer, e.g., a storage medium storing the program codes, constitute the present invention.

The storage medium for storing such program codes may be a floppy disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment function but also the program codes in cooperation with an OS (operating system) running on the computer or with another application or the like realize the embodiment function.

It is obvious that the scope of the invention also contains the case wherein the functions of each embodiment can be realized by writing the program codes into a memory of a function expansion board inserted into a computer or of a function expansion unit connected to the computer, and thereafter by executing a portion or the whole of actual processes by a CPU of the function expansion board or function expansion unit.

What is claimed is:

1. A display apparatus comprising:
   a lens for capturing light from a real world;
   a lens state control unit for controlling a state of said lens, the state including a focus;
   a storage unit for storing computer graphics object image data;
   a computer graphics object image generation unit for generating a computer graphics object image to be synthesized to an image captured via said lens by using the stored computer graphics object image data;
   a synthesis display unit for synthesizing the image captured via said lens and the generated computer graphics object image and displaying a synthetic image; and
   a judging unit for judging whether it is necessary to focus on the computer image,
   wherein, if it is judged by said judging unit that it is necessary to focus on the computer image, said lens state control unit controls to display the computer image without unsharpening the computer image, and
   if it is judged by said judging unit that it is not necessary to focus on the computer image, said lens state control unit controls to increase a degree of unsharpening of the computer image as a virtual distance to the computer image and a focus distance of said lens increase.

2. A display apparatus according to claim 1, wherein said computer graphics object image generation unit makes unsharp the generated computer graphics object image in accordance with a virtual distance to the generated computer graphics object image from an optical center of said lens.

3. A display apparatus according to claim 2, wherein the computer graphics object image data includes three-dimension computer graphics data.

4. A display apparatus according to claim 1, wherein the computer graphics object image data includes three-dimension computer graphics data.

5. A display apparatus according to claim 1, wherein the computer graphics object image data includes an actual photographed image data and depth data.

6. A display apparatus according to claim 1, wherein a focus of said lens is changed in accordance with a computer image object having a largest display area or a computer image in a central area of a display image.

7. A display apparatus according to claim 1, wherein a focus of said lens is changed in accordance with an importance degree of a computer image object.

8. A display apparatus according to claim 1, wherein said judging unit judges it is necessary to adjust if the computer image occupies most of a central area of a view field.

9. A display apparatus according to claim 1, wherein said judging unit judges it is necessary to adjust if the computer image is in a center of a view field.

10. An information processing method of synthesizing an actual photographed image taken via a lens and a computer image and displaying a synthetic image, the method comprising steps of:
    storing computer graphics data in correspondence with position information;
    generating a computer graphics object from the computer graphics data corresponding to the position information of the actual photographed image;
    synthesizing the actual photographed image and the generated computer graphics object; and
    judging whether it is necessary to focus on the lens to the computer graphics object,
    wherein, if it is judged that it is necessary to focus on the computer image, the computer image is displayed without unsharpening the computer image, and
    if it is judged that it is not necessary to focus on the computer image, a degree of unsharpening of the computer image is increased as a virtual distance to the computer image and a focus distance of the lens increase.

11. A computer-readable medium encoded with a computer program for performing an information processing method of synthesizing an actual photographed image taken via a lens and a computer image and displaying a synthetic image, the method comprising steps of:
    storing computer graphics data in correspondence with position information;
    generating a computer graphics object from the computer graphics data corresponding to the position information of the actual photographed image;
    synthesizing the actual photographed image and the generated computer graphics object; and
    judging whether it is necessary focus on the lens to the computer graphics object,
    wherein, if it is judged that it is necessary to focus on the computer image, the computer image is displayed without unsharpening the computer image, and
    if it is judged that it is not necessary to focus on the computer image, a degree of unsharpening of the computer image is increased as a virtual distance to the computer image and a focus distance of the lens increase.

* * * * *

UNITED STATES PATENT AND TRADEMARK OFFICE
CERTIFICATE OF CORRECTION

PATENT NO. : 7,411,588 B2 Page 1 of 1
APPLICATION NO. : 11/126355
DATED : August 12, 2008
INVENTOR(S) : Tsuyoshi Kuroki et al.

It is certified that error appears in the above-identified patent and that said Letters Patent is hereby corrected as shown below:

<u>COLUMN 9</u>:

Line 57, "sion" should read --sional--.
    Line 60, "sion" should read --sional--.

<u>COLUMN 10</u>:

Line 50, "focus" should read --to focus--.

Signed and Sealed this

Thirty-first Day of March, 2009

JOHN DOLL
*Acting Director of the United States Patent and Trademark Office*